(No Model.)
A. HAARLANDER.
WATER CLOSET TANK.
No. 385,709. Patented July 10, 1888.
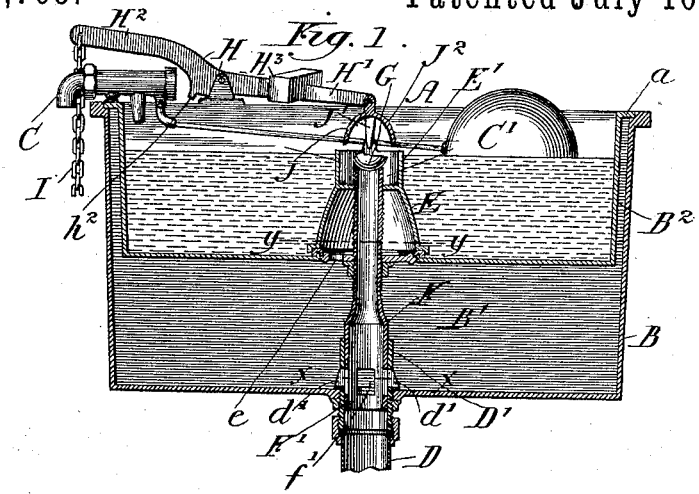
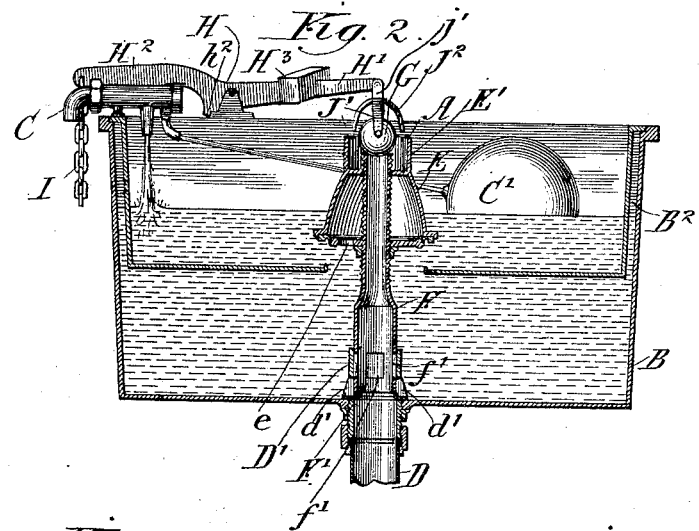
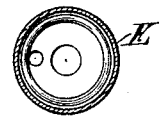
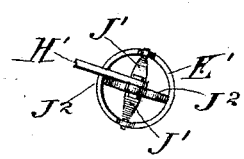
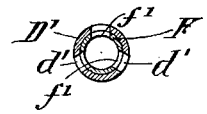
Witnesses:
G. G. Jackson.
Bruce W. Parker,
Inventor:
August Haarlander.
By Chas. S. Burton.
Attorney.

UNITED STATES PATENT OFFICE.

AUGUST HAARLANDER, OF ALLEGHENY CITY, PENNSYLVANIA.

WATER-CLOSET TANK.

SPECIFICATION forming part of Letters Patent No. 385,709, dated July 10, 1888.

Application filed September 2, 1886. Serial No. 212,465. (No model.)

*To all whom it may concern:*

Be it known that I, AUGUST HAARLANDER, a citizen of the United States, residing at Allegheny city, in the county of Allegheny and State of Pennsylvania, have invented certain new and useful Improvements in Water-Closet Tanks, which are fully set forth in the following specification, reference being had to the accompanying drawings, forming a part thereof.

Figure 1 is a vertical longitudinal section through tank service-box and valves, showing the operating mechanism in front elevation, the valves and mechanism being in position as when the device is not in action. Fig. 2 is a similar view showing the parts in the position to allow the service-box to fill preparatory to flushing the closet. Fig. 3 is a horizontal section taken at the line X X of Fig. 1. Fig. 4 is a horizontal section taken at the line Y Y of Fig. 1. Fig. 5 is a plan of the upper part of the valve between the tank and service-box and sundry devices connected therewith.

A is the tank or cistern; B, an exterior box or tank which serves as the service-box.

The tank A is adapted to be inserted within the tank B and be supported by its flange $a$, resting upon the upper edge of the tank B, and to fix its position accurately the edge of the latter is preferably rabbeted, as shown. This accuracy and fixedness of relation of the tanks to each other is necessary in view of the fact, hereinafter stated, that a valve-stem passes through the bottom of both and carries two valves, one seating in each tank.

Tank B is considerably deeper than the tank A and slightly larger than its horizontal dimensions, so that when the tank A is inserted within it, as described, a space, B', remains below the tank A, and a small space, $B^2$, remains all around the tank A.

In case the water in the tank A should freeze and burst the tank, the space $B^2$, permitting expansion of the tank A without affecting the tank B, prevents the bursting of the latter, and even should water be accumulated in tank B and freeze, the same space will permit the expansion of the water and prevent damage to the tank B. It serves, also, as an air-space when the service-box is empty to prevent the tank B from becoming so much cooled by the water in the tank A as to produce condensation of moisture upon its outer surface, which would rust the same and cause further damage by dripping.

E is the supply-pipe, controlled in the usual manner by a valve operated by the float C'.

D is the flushing-pipe which is connected at the bottom of the tank B.

E is a valve which controls the flow of water from the tank A into the tank B through the aperture A' in the bottom of the former.

F is a tubular valve stem, serving, also, other purposes, hereinafter set forth. It is screwed entirely through the valve E and extends downward therefrom through the portion B' of the tank or service-box B and into the mouth of the flushing-pipe D.

Upon the bottom of the tank B is fixed an upright sleeve, D', which is in effect a continuation of the flushing-pipe as if the latter protruded through the bottom of the tank. Into this sleeve the lower portion, F', of the valve-stem F fits closely, and thus constitutes a sliding valve therein. This sleeve is provided with apertures $d'$, which may admit water from the service-box B into the flushing-pipe when said apertures are not closed by the valve F'.

The apertures or ports $d'$ are of considerable length vertically, and through the valve stem F, above the valve proper, F', there are made apertures $f'$, located at a little distance above the lower end of said valve. The precise location and length of these apertures may be varied according to circumstances, as hereinafter explained, but will in general be such that when the valve E is seated their upper portion will coincide with the apertures $d'$, and they will extend a short distance below said apertures—that is, below the inner surface of the bottom of the service-box B.

The valve E is provided upon the upper side with a cup, E'. The upper end of the valve-stem F protrudes up through the bottom of the cup, but not as high as the top of it. In this cup and over the mouth of the tubular stem F is placed the light ball G, acting as a valve to close the aperture through the stem, and operating as and for the purpose hereinafter explained.

H is a lever pivoted upon the top of tank A, having connected to one end the pull-chain I, and to the other end the link J, which is connected to and operates the valve E by being forked at $j$, and having the branches J' hooked into the eyes I' of the upper edge of the cup E'. Two other branches, J$^2$, are added, and, with the branches J', constitute a cage which overhangs and serves to retain the ball G in the vicinity of the mouth of the tubular stem F.

The arm H' of the lever H carries the adjustable weight H$^3$, and the arm H$^2$ has the lug $h^2$, which engages the edge of the bracket H$^4$, upon which the lever is pivoted to stop the motion of the lever and limit the distance to which the valve E is lifted.

The operation of this device is as follows: When not in use for the purpose of flushing, the valve E seats upon its seat and closes communication between the tank A and the service-box B, and the valve F' stands in the position to leave open the ports $d'$, so that the service-box B is empty, and any drippings or water by any means entering it from the tank A pass out freely through the flushing-pipe. The valves are held in this position by the weight H$^3$, forcing down the valve E and the stem F and valve F'. In this position the ball-valve G rests freely over the mouth of the tubular stem F, under the cage formed by the arm J$^2$, and will be floated off the mouth of the stem F in case any overflow from the tank shall enter the cup and require to be discharged through the stem F. When the lever H is operated by means of the pull I, the valve E is lifted and admits the water into the service-box B. If the valve E is lifted slowly, carrying with it the stem F and the valve F', before it has risen sufficiently to cause the valve F' to close the ports $d'$ the water which has passed into the service-box B from the tank A will begin to flow out through said ports into the flushing-pipe, thus furnishing a forewash to the closet. As the valve E continues to rise, the valve F' gradually closes the ports $d'$, stopping the forewash, and they remain closed while the service-box fills. When the pull I is released, the weight H$^3$ causes the arm H' of the lever H to fall and force the valve E downward onto its seat, closing communication between the tank A and the service-box B. The same movement carries the valve F' also downward and brings the ports $f'$ coincident with the ports $d'$, and thus opens communication from the service-box B to the flushing-pipe D, and the contents of the service-box are discharged freely into said pipe and thence into the bowl.

The tubular valve-stem F constitutes the overflow-duct, which is contracted at the upper part, F$^2$, in order that the current of water which overflows through it shall not be sufficient to fill it, and may not have the effect of producing a suction which shall draw the valve G onto its seat, causing it to be retained over the mouth of the duct by atmospheric pressure and preventing further overflow. The air which will be present around the current of water below the contracted portion will break the column at that point, and the short column above that point will not be sufficient to overcome the buoyancy of the valve G.

The use of the valve G is to prevent the unpleasant sound which is ordinarily caused by water overflowing into a pipe in quantity insufficient to fill the pipe, and consequently leaving in the pipe a column of air, which is put in vibration by the passing water. The water also tends to draw air down with it, and the air, tending constantly to escape through the water, causes, beside the vibration, a bubbling sound. The presence of the valve G, resting upon the surface of the current of water which is entering the pipe, causes it to flow smoothly and checks the vibration in the air-column within such water-stream, and, by closing all of the apertures not filled by the water, prevents the entrance of air to a greater extent than the water is able to carry with it into the flushing-pipe and closet.

The ports $f'$ above the valve F' are preferably so located that when the valve E is seated the lower edge of said ports—that is to say, the upper edge of the valve proper, F'—is a little below the ports $d'$, so that the valve E will open a short distance before the valve F' will commence to close the ports $d'$. This insures a forewash, and the duration and amount of such forewash may be regulated, according to the condition and mode of use of the fixture which is supplied by the tank, by screwing the valve E up or down on the stem F. This adjustment would affect the overflow-point, if that point were determined by the position of the entrance into the tubular stem F, and since, to prevent waste of water by continuous flow, it is essential that the supply-valve should shut off at the height of the water maintained by the overflow, it is important that the overflow-point should not be subject to variation on account of the adjustment of the valve E on the stem, and to prevent this is one purpose of the cup E' on top of the valve E, the upper edge of the cup being the overflow-point, and invariable when the valve is seated, regardless of the position of the valve-stem.

In order to avoid the necessity of packing the joints where the stem F is screwed through the upper and lower ends of the valve-shell E, I provide the hole $e$ in the bottom of said shell, from which any water which may enter around the thread may escape into the service-box.

I claim—

1. In combination, the supply-tank and service-box, the former being wholly within the latter and fixedly stopped against the wall thereof on all sides, and a rigid stem carrying two valves seated in the bottoms of the tank and box, respectively, substantially as and for the purpose set forth.

2. In combination with the supply-tank, the valve controlling the flow of water therefrom, the tubular stem of said valve serving as an overflow-pipe to prevent the entrance of air into the pipe during overflow from the tank, the weighted lever which depresses said valve, the floating valve G, and the cage J, suspended from said lever about the valve F to retain it near the tubular stem, substantially as set forth.

3. In combination, substantially as set forth, the supply-tank, its overflow-pipe, and the floating valve G, suitably retained near the entrance of the overflow-pipe, the said pipe being contracted at its upper part to prevent the overflow-current seating the floating valve.

In testimony whereof I have hereunto set my hand, in the presence of two witnesses, this 27th day of August, A. D. 1886.

AUGUST HAARLANDER.

Witnesses:
FRANCIS J. TORRANCE,
FRANK A. WELLS.